United States Patent [19]

Chang

[11] 4,206,083
[45] Jun. 3, 1980

[54] CATALYST FOR OZONE DECOMPOSITION

[75] Inventor: Jeffrey C. Chang, Woodbury, Minn.

[73] Assignee: Minnesota Mining and Manufacturing Company, Saint Paul, Minn.

[21] Appl. No.: 944,127

[22] Filed: Sep. 20, 1978

[51] Int. Cl.$^2$ .................. B01J 29/06; B01J 23/34
[52] U.S. Cl. .................. 252/455 R; 252/466 PT; 252/471; 423/210; 252/460
[58] Field of Search ............ 252/455 R, 471, 466 PT; 423/210 S

[56] References Cited

U.S. PATENT DOCUMENTS

| | | | |
|---|---|---|---|
| 2,298,607 | 10/1942 | Anderson, Jr. | 423/210 S |
| 3,269,801 | 8/1966 | Boberg et al. | 423/210 S |
| 3,554,929 | 1/1971 | Aarons | 252/471 X |
| 3,682,585 | 8/1972 | Frevel et al. | 252/471 X |

Primary Examiner—Carl F. Dees
Attorney, Agent, or Firm—Cruzan Alexander; Donald M. Sell; Richard Francis

[57] ABSTRACT

Coprecipitation of platinum, palladium, and manganese oxide on a suitable ceramic support gives an efficient catalyst for the decomposition of ozone at elevated temperatures. Activity is restored by exposure to air for periods of a few hours.

4 Claims, No Drawings

CATALYST FOR OZONE DECOMPOSITION

This invention relates to a catalyst for the decomposition of ozone and particularly for the catalytic decomposition of ozone in air for high altitude airplane cabins.

For many years, as described in U.S. Pat. No. 3,269,801, it has been recognized that ozone is present in the atmosphere in toxic concentrations at altitudes of about 9–46 km. Aircraft flying at those altitudes obtain fresh air for use in the cabins by scooping in air from outside, so called "ram air." Because ram air is very much compressed its temperature is raised to several hundred degrees centigrade. Such air must be treated before it can be permitted into the cabins and particularly it is a requirement that the ozone concentration be reduced to below 1 p.p.m. Several procedures and catalysts have been proposed for the decomposition of the ozone, but improvements in the activity of the catalysts, regeneratability, etc. are needed to make the system more efficient.

It has been found that an especially valuable catalyst is obtained by simultaneous deposition of platinum, palladium, and manganese oxide on a suitable refractory substrate. Insofar as is known to Applicant such an empirical composition is not known for Applicant's purposes although individual components may have been used for somewhat similar processes as in U.S. Pat. No. 3,498,927. In particular, contact catalysts of the invention are obtained by impregnating the catalyst support with a solution containing about 0.05% to 10% $H_2PtCl_6 \cdot 6H_2O$, 0.05% to 10% $PdCl_2$, and 0.06% to 25% $Mn(NO_3)_2$. The palladium salt is more readily dissolved in very acidic solution. After drying the impregnated support is heated to give in weight percent, about 0.0024 to 0.47% Pt, 0.0038 to 0.75% Pd, and 0.0023 to 0.96% manganese oxide, $MnO_x$. The exact composition of the oxide is not determinable but it is believed to be about 2, e.g., 1.5 to 2.5. Preferred refractory supports are the honeycomb ceramics produced as described in U.S. Pat. No. Re 27,747.

EXAMPLE 1

A corrugated ceramic cylinder having the corrugations running lengthwise and about 5 cm. dia. and 7.5 cm long and composed of cordierite is washed with distilled water, dried and coated with $\gamma$-$Al_2O_3$, suitably by using commercially available dispersions containing 10% by weight alpha-alumina hydrate available from Petrochemical Dept., Continental Oil Company, Saddle Brook, N.J. as DISPAL® "M" ALUMINA. The cooled cylinder is heated at 550° C. in air for 1.5 hours to generate gamma-alumina. Other methods of applying gamma-alumina may be used if desired for example, the procedure of U.S. Pat. No. 3,554,929. After cooling the cylinder is impregnated with 218 ml. of a solution containing 2.4% $H_2PtCl_6 \cdot 6H_2O$, 0.75% $PdCl_2$, and 3.2% $Mn(NO_3)_2$, by weight, and excess solution is removed by forced air. The sample is dried in a microwave oven for about one minute and then heated to 520° C. for several hours to decompose to Pt/Pd/$MnO_x$ catalyst of the invention. The sample thus made contains approximately 1.7% by weight of $\gamma$-$Al_2O_3$, 0.25% Pt, 0.11% Pd and 0.39% $MnO_x$ (x is slightly less than 2). One of the samples is cut into two 2.5 cm dia.×7.5 cm long cores. The two cores are placed 2.5 cm apart in series in a tubular reactor and tested for ozone decomposition efficiency from a feed of 3 ppm ozone in an air flow of 0.425 m³/min. at 177° C. The average contact time is $1.1 \times 10^{-2}$ sec. and average pressure drop is 0.047 atm. Several variations are introduced during 100 hours of intermittent running including periods when air free from $O_3$ is passed through the cores for periods at various temperatures. The ozone decomposition efficiency starts at 94%, gradually decreases and levels off between 85 and 89% after 100 hours of use. The catalyst of the invention is regenerated simply with air at the temperature used for ozone catalytic decomposition or at room temperature. The results are tabulated in Table 1 with times rounded to tenths of hours.

Table 1

| Elapsed Time | % $O_3$ Removal | Elapsed Time | % $O_3$ Removal |
|---|---|---|---|
| 0.3 | 94.1 | 60.8 | 87.9 |
| 0.8 | 93.5 | 61.7 | 87.6 |
| 0.9 | 93.2 | 67.5 | 87.8(d) |
| 1.7 | 91.8 | 68.01 | 94.1 |
| 5.2 | 91.8 | 68.3 | 93.0 |
| 10.0 | 90.6 | 68.4 | 92.3 |
| 10.5–23.6 | (a) | 68.8 | 92.5 |
| 24.3 | 88.7 | 70.8 | 90.5 |
| 25.2 | 88.4 | 75.0 | 89.6 |
| 25.3 | 87.3 | 78.3 | 89.3 |
| 28.2 | 86.3 | 79.2 | 89.0(e) |
| 39.3 | 85.2 | 80.1 | 91.3 |
| 43.7 | 84.1 | 80.8 | 89.9 |
| 45.0 | 83.7 | 81.7 | 89.0 |
| 47.2 | 85.7(b) | 82.5 | 89.1 |
| 47.6 | 94.6 | 89.2 | 88.8 |
| 48.0 | 94.3 | 89.9 | 88.8 |
| 48.7 | 93.7 | 90.3 | 88.3 |
| 49.8 | 92.6(c) | 91.7 | 87.7 |
| 56.8 | 91.1 | 98.3 | 87.3 |
| 57.5 | 91.1 | 99.2 | 88.3 |
| 58.3 | 88.9 | 100.0 | 87.3 |

(a) Various tests in which one core is used at similar or lower temperatures and when test was discontinued for 3 hours.
(b) Several variations in air flow between 45.0 and 47.2 followed by 16 hours of air flow without $O_3$ at 177° C.
(c) Temperature reduced and air flow reduced for several hours followed by air flow without $O_3$ at room temperature.
(d) Air flow without $O_3$ for 11 hours.
(e) Air flow without $O_3$ for 11 hours.

What is claimed is:

1. In an apparatus for reduction of ozone content of air intended for human respiration, a contact catalyst comprising refractory support means and coprecipitated platinum, palladium and maganese oxide in relative proportions by weight of 0.0024% to 0.47% Pt, 0.0038% to 0.75% Pd and 0.0023% to 0.96% $MnO_x$ where x is 1.75 to 2.5.

2. Contact catalyst according to claim 1 wherein the body of the support is a honeycomb structure of cordierite coated with gamma-alumina.

3. Contact catalyst according to claim 2 wherein there is 1.7% gamma-alumina, 0.25% Pt, 0.11% Pd, and 0.39% $MnO_x$.

4. Process for producing a contact catalyst for decomposition of ozone present in air comprising
   (A) impregnating a catalyst support with a solution comprising
      1. 0.05 to 10% chloroplatinic acid hexahydrate
      2. 0.05 to 10% palladous chloride and
      3. 0.06 to 25% manganous nitrate
   (B) drying the impregnated catalyst support and
   (C) heating the impregnated catalyst support in air at a temperature sufficient to reduce chloroplatinic acid to platinum metal and palladous chloride to palladium metal and to oxidize manganous nitrate to manganese oxide.

* * * * *